UNITED STATES PATENT OFFICE.

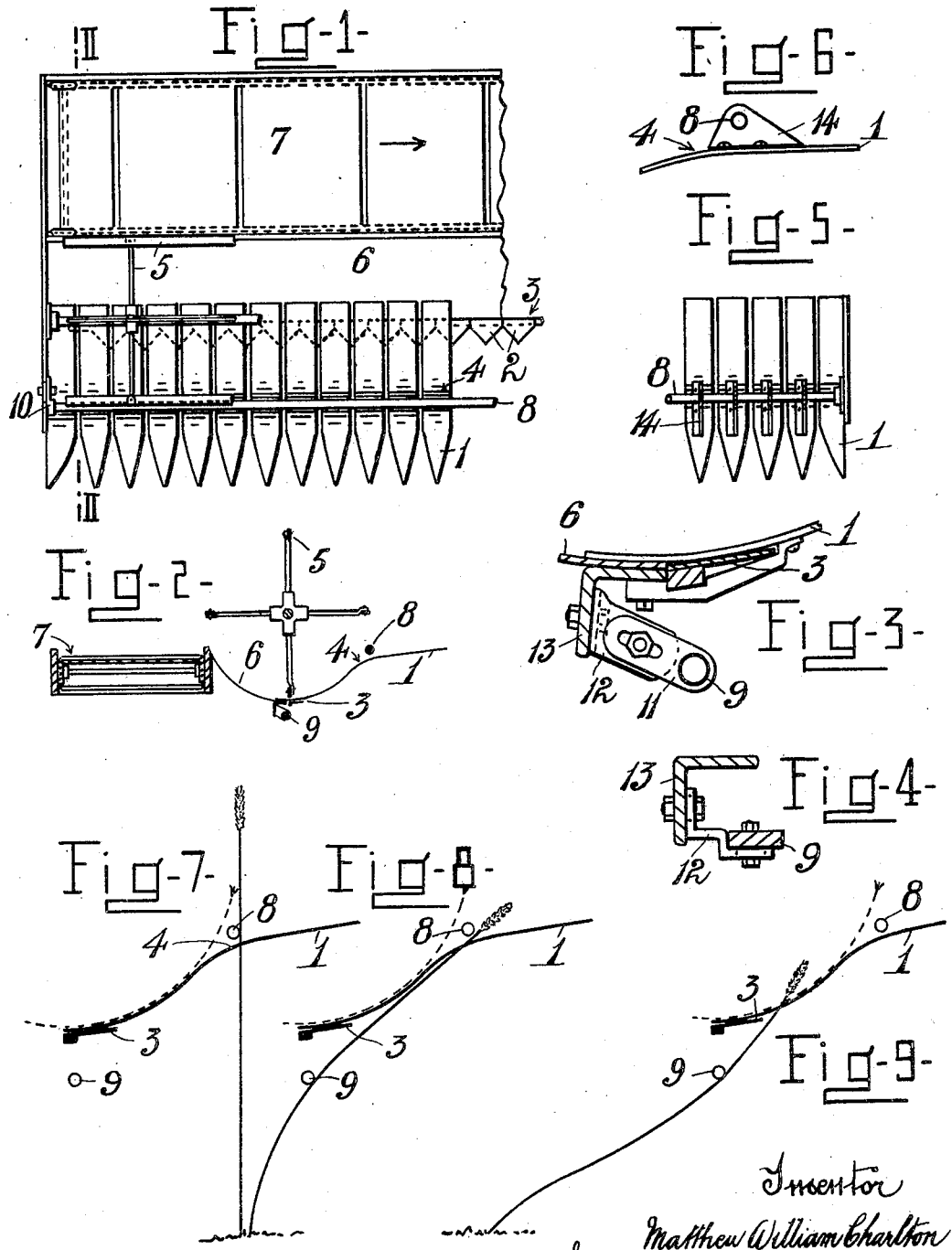

MATTHEW WILLIAM CHARLTON, OF NEWPORT, VICTORIA, AUSTRALIA, ASSIGNOR TO MASSEY HARRIS COMPANY LIMITED, OF TORONTO, CANADA.

HEADER-HARVESTER.

No. 887,311.  Specification of Letters Patent.  Patented May 12, 1908.

Application filed June 17, 1907. Serial No. 379,431.

*To all whom it may concern:*

Be it known that I, MATTHEW WILLIAM CHARLTON, a subject of the King of Great Britain, residing at No. 19 Steel street, Newport, in the State of Victoria, Australia, engineer, have invented a Header-Harvester, of which the following is a specification.

This invention relates to that class of grain harvester or combined header and thresher wherein the heads of the standing crop are cut off by means of a mechanically operated knife and relates particularly to the gathering or cutting mechanism of such machines, while its objects are to limit the quantity of straw cut off with the heads and so minimize the power necessary to drive the machine and also to minimize the waste caused by the cut heads falling to the ground. These results are attained by dispensing with the guards or fingers used on ordinary machines of a similar type and substituting therefor long, broad teeth forming a comb, with a knife operating near the rear end of the teeth, said comb having the interstices between the teeth sufficiently narrow to prevent the cut heads of the crop passing therethrough while the teeth are of such a width that the centers of said interstices will practically correspond with the width of the sections comprising the knife. Said comb teeth are also curved or "breasted" so that a small rotating reel or other sweeping element moving close to the upper surface of the teeth for a distance in front of the knife may be employed for the purpose of sweeping the cut heads away from the incoming crop and delivering them to a transverse conveyer placed behind the knife, and preferably over a plate arranged between said knife and conveyer. Furthermore transverse "breasting" elements are placed above and below the comb teeth and in such a position that the straw of the crop cannot come into contact with the knife until it has been "breasted" or pushed sufficiently ahead by the forward travel of the machine to allow the heads of the incoming crop to pass underneath the top "breasting" element after which the straw passes backwards through the interstices of the comb teeth until it contacts with said knife. It will thus be seen that the heads are cut off while the straw is "breasted" or leaning forward at an angle after having passed underneath the top "breasting" element and that the heads after being cut off will fall forward and lie on the teeth until swept away by the rotating reel or other sweeping element hence the necessity of curving the comb teeth to correspond to the sweep of said sweeping element for a distance in front of the knife. A distinct difference will also be apparent between this system of "breasting" the straw forward before being cut and the ordinary system of using a comparatively large rotating reel on machines of a similar type to gather the crop backwards and while it is being cut hold it against the knife at whatever height the cutting devices may be set.

In order that the invention may be clearly understood the following drawings are appended.

Figure 1 is a plan of portion of the gathering or cutting mechanism. Fig. 2 is a vertical transverse section on line II—II, Fig. 1. Figs. 3 and 4 are enlarged sections showing two forms of lower breasting elements. Fig. 5 is a plan of a few teeth showing means for connecting each tooth to the upper breasting element, while Fig. 6 is an enlarged side elevation of said construction. Figs. 7, 8 and 9 are diagrammatic views illustrating in sequence the manner in which the crop is "breasted" or pushed forward for the purpose specified.

According to this invention the comb consists of a number of long broad teeth 1, spaced sufficiently close to prevent the heads of grain dropping or passing therethrough, while the width of said teeth is such that the centers of the interstices between same will approximately correspond with the width of the sections 2 comprising the knife 3 which operates near the rear end of said comb. The comb teeth are also "breasted" that is, they are curved upwardly from the rear while their forward ends are preferably flat and extend forwardly thus forming a "breast" 4 at about their centers. The length and exact curvature of the rear end of said teeth is determined by the sweeping element employed for sweeping the heads after being cut off by the knife. In the drawings the sweeping element is illustrated as a slowly rotating reel 5, which operates along the upper surface of the teeth for a distance in front of the knife and carries the heads away, thus making room for the incoming crop and preventing the comb from becoming choked. The heads are preferably swept over a plate 6 at the rear of the comb as shown and delivered upon a transverse conveyer 7 by which they are carried away to be threshed.

It will be obvious that other devices than a reel may be employed for sweeping the cut heads off the comb and it is to be clearly understood that any such sweeping element may be substituted so long as it will sweep closely along the surface of a portion of the rear end of the comb, and deliver the heads to a transverse conveyer.

In order to minimize the quantity of straw left with the heads when cut off by the knife, transverse horizontal breasting elements 8, 9, are employed above and below the comb for pushing forward the crop. These are placed in such positions that the straw of the crop cannot come into contact with the knife 3 until it has been "breasted" or pushed sufficiently forward by the travel of the machine to allow the heads to pass underneath the top breasting element. The effect of this arrangement is, that, notwithstanding the fact that the heads of the crop may be some distance above the height of the knife the straw is bent at such an angle or curve that it is cut close below the heads as will be readily understood by reference to Figs. 7, 8 and 9 of the drawings. These breasting elements may be formed of any suitable shape and may consist of a flat bar, rod, tube or roller and may be made adjustable.

In Figs. 1 and 2 the breasting elements 8, 9, are shown to consist of light rods mounted in adjustable bearings 10 on the mechanism while in Fig. 3, the lower breasting element 9 is shown to consist of a tube mounted in a bearing 11 adjustably secured to a bracket 12 attached to the comb bar 13 and in Fig. 4 a flat bar 9 is shown attached to an adjustable bracket 12 on said comb bar.

In Figs. 5 and 6 means are shown whereby the comb teeth may be supported and stiffened by the top breasting element 8 and in this case the tube passes through light brackets 14 secured to each tooth. These breasting elements are preferably made adjustable so that the quantity of straw cut off with the heads may be regulated and they are fixed in such positions that an imaginary straight line drawn from one to the other would be in advance of the knife.

Where a slowly rotating reel is employed as the sweeping element, the top breasting element 8 is situated close to the point where said reel approaches the comb i. e. at or about the top of the breast 4 of the latter, while the lower breasting element 9 is situated approximately underneath the knife and in close proximity thereto.

Having now particularly described and ascertained my said invention and in what manner the same is to be performed, I declare that what I claim is;—

1. In header harvesters the combination of a comb having its teeth bent downwardly and rearwardly to form breasts intermediate their ends; a reciprocating knife at the rearward end of the comb; and breasting means for bending forward the grain to present it to the knife in an inclined position and while still in contact with the breasting means.

2. In header harvesters the combination of a mechanically operated knife; a comb having its teeth bent downwardly and rearwardly to form breasts intermediate their ends, and spaced sufficiently close to prevent the heads of grain passing therethrough; and means above and below said comb for pushing forward the straw of the crop, all for the purposes specified.

3. In header harvesters the combination of a mechanically operated knife; a comb having its teeth bent downwardly and rearwardly to form breasts intermediate their ends, and spaced sufficiently close to prevent the heads of grain passing therethrough; means above and below said comb for pushing forward the straw of the crop; means for sweeping the harvested grain from said comb; and a transverse conveyer behind the latter, all for the purposes specified.

4. In header harvesters the combination of a mechanically operated knife; a comb having its teeth bent downwardly and rearwardly to form breasts intermediate their ends, and spaced sufficiently close to prevent the heads of grain passing therethrough; means above said comb for pushing forward the straw of the crop; means for sweeping the harvested grain from said comb; a plate behind said comb; and a transverse conveyer behind said plate, all for the purposes specified.

5. In header harvesters the combination of a comb having its teeth bent downwardly and rearwardly to form breasts intermediate their ends; a reciprocating knife at the rearward end of the comb; breasting means for bending forward the grain to present it to the knife in an inclined position and while still in contact with the breasting means; and means for sweeping the harvested grain from the comb.

6. In header harvesters the combination of a comb having its teeth bent downwardly and rearwardly to form breasts intermediate their ends; a reciprocating knife at the rearward end of the comb; breasting means for bending forward the grain to present it to the knife in an inclined position; means for sweeping the harvested grain from the comb; a plate behind the comb; and a transverse conveyer behind said plate.

7. In header harvesters the combination of a comb having its teeth bent downwardly and rearwardly to form breasts intermediate their ends; a reciprocating knife at the rearward end of the comb; and a breasting bar extending transverse of the comb and below the knife.

8. In header harvesters the combination of a comb having its teeth bent downwardly and rearwardly to form breasts intermediate their ends; a reciprocating knife at the rearward end of the comb; a breasting bar extending transverse of the comb and below the knife; and means for adjusting the bar forwardly or rearwardly.

9. In header harvesters the combination of a mechanically operated knife; a comb having long teeth spaced sufficiently close to prevent the heads of grain passing therethrough; means above and below said comb for pushing forward the straw of the crop; means for sweeping the harvested grain from said comb; and a transverse conveyer behind the latter, all for the purposes specified.

10. In header harvesters the combination of a mechanically operated knife; a comb having long teeth spaced sufficiently close to prevent the heads of grain passing therethrough; means above and below said comb for pushing forward the straw of the crop; means for sweeping the harvested grain from said comb; a plate behind said comb; and a transverse conveyer behind said plate, all for the purposes specified.

11. In header harvesters the combination of a comb having its teeth bent downwardly and rearwardly to form breasts intermediate their ends; a reciprocating knife at the rearward end of the comb; breasting means for bending forward the grain to present it to the knife in an inclined position; means for sweeping the harvested grain from the comb; a plate behind the comb; and a transverse conveyer behind said plate higher than the rear of the comb.

12. In header harvesters the combination of a comb having its teeth bent downwardly and rearwardly to form breasts intermediate their ends; a reciprocating knife at the rearward end of the comb; breasting means for bending forward the grain to present it to the knife in an inclined position; a curved plate behind the comb; a rotary reel adapted to sweep the grain from the comb over the plate; and a transverse conveyer behind said plate higher than the rear of the comb.

In testimony whereof I have hereunto set my hand in presence of two subscribing witnesses.

MATTHEW WILLIAM CHARLTON.

Witnesses:
EDWARD NEEDHAM WATERS,
WILLIAM HERBERT WATERS.